US012719936B1

(12) United States Patent
Marili

(10) Patent No.: US 12,719,936 B1
(45) Date of Patent: Aug. 25, 2026

(54) SMARTSTEALTH AGENT FOR SECURE COGNITIVE USER PROFILING IN CYBERSECURITY SYSTEMS

(71) Applicant: Or Marili, Haifa (IL)

(72) Inventor: Or Marili, Haifa (IL)

( * ) Notice: Subject to any disclaimer, the term of this patent is extended or adjusted under 35 U.S.C. 154(b) by 60 days.

(21) Appl. No.: 19/303,546

(22) Filed: Aug. 19, 2025

(51) Int. Cl.
*H04L 9/40* (2022.01)
*G06F 21/50* (2013.01)
*G06F 21/55* (2013.01)
*H04W 12/065* (2021.01)

(52) U.S. Cl.
CPC ............ *H04L 63/205* (2013.01); *G06F 21/50* (2013.01); *G06F 21/554* (2013.01); *H04L 63/0407* (2013.01); *H04L 63/0421* (2013.01); *H04L 63/0428* (2013.01); *H04L 63/0435* (2013.01); *H04W 12/065* (2021.01)

(58) Field of Classification Search
CPC ............... H04L 63/205; H04L 63/0407; H04L 63/0421; H04L 63/0428; H04L 63/0435; G06F 21/50; G06F 21/554; H04W 12/065
See application file for complete search history.

(56) References Cited

U.S. PATENT DOCUMENTS

| | | | | |
|---|---|---|---|---|
| 10,484,471 | B2 | 11/2019 | Fullbright et al. | |
| 10,997,168 | B2 | 5/2021 | Eltabakh et al. | |
| 11,223,619 | B2 | 1/2022 | Turgeman | |
| 11,399,761 | B2 | 8/2022 | Intrator | |
| 2015/0381348 | A1* | 12/2015 | Takenaka | H04L 9/3093 380/30 |
| 2019/0034660 | A1* | 1/2019 | Ford | G06F 21/552 |
| 2020/0123456 | A1 | 4/2020 | Al-Ghamdi et al. | |

* cited by examiner

*Primary Examiner* — Huan V Doan

(57) ABSTRACT

The invention relates to cybersecurity systems leveraging neuro-cognitive user profiling for real-time anomaly detection. It introduces a stealth-mode endpoint agent designed to collect encrypted micro-interaction telemetry—including cursor dynamics, typing cadence, window focus ETC—without significantly impacting system performance or requiring elevated privileges. Captured signals are transmitted to a centralized AI engine that constructs individualized behavioral baselines and detects deviations using adaptive learning algorithms. The system supports both agent-based and agentless deployments, enabling hybrid use in cloud, on-premise, and BYOD environments. Privacy compliance is addressed through local preprocessing and encryption, aligned with frameworks such as GDPR and HIPAA. The invention is designed to improve behavioral anomaly detection while minimizing operational impact and supporting compatibility across enterprise environments.

30 Claims, 7 Drawing Sheets

SMARTSTEALTH AGENT FOR SECURE COGNITIVE USER PROFILING IN CYBERSECURITY SYSTEMS

CROSS-REFERENCE TO RELATED APPLICATIONS

This application is related to U.S. Non-Provisional patent application Ser. No. 19/276,104 filed on Jul. 22, 2025, titled "AI PROFILE SENTINEL—NEURO-COGNITIVE CYBERSECURITY SYSTEM", by the same inventor. The present application discloses a distinct invention directed toward the endpoint-side behavioral telemetry agent, while the related application focuses on the centralized AI-based analysis engine. No claim of priority is made between the two applications.

FIELD OF THE INVENTION

The present invention relates to the field of cybersecurity and behavioral analytics, and more specifically to a stealth-based endpoint module, named "SmartStealth Agent", designed to securely collect, process and transmit user neuro-cognitive behavioral signals for anomaly detection and predictive threat identification in enterprise environments.

BACKGROUND

Conventional endpoint agents introduce notable system overhead, user privacy issues, and resistance to adoption due to their visibility and administrative access requirements. Current cybersecurity frameworks, including SIEM and UEBA systems, predominantly rely on coarse-grained event logs, lacking real-time cognitive or behavioral fidelity.

Unlike these systems, the present invention integrates deep behavioral sensing at the user level, operating covertly with minimal footprint, and without requiring continuous admin intervention or user awareness.

SUMMARY OF THE INVENTION

SmartStealth Agent is a lightweight, nearly invisible daemon process that operates on enterprise endpoints to capture high-resolution micro-interactions-such as cursor motion, typing dynamics, screen focus changes, and contextual cues. This telemetry is locally pre-processed, encrypted, and optionally transmitted to a centralized management system for storage or further handling.

The present invention is solely directed to endpoint-side telemetry acquisition, pre-processing, encryption, stealth deployment, and network obfuscation methods.

Any server-side cognitive profiling, behavioral modeling, or risk-scoring functionalities are implemented in separate and distinct systems and are outside the scope of the present invention.

The architecture is hybrid by design, supporting both agent-based and agentless endpoint collection modes, and is suitable for cloud-native, on-premises, or hybrid enterprise environments. The agent's architecture enables rapid, streamlined deployment across enterprise endpoints, reducing time-to-protection without requiring elevated permissions or causing system interruption.

Advantages Over Prior Art (Part A—General)

The SmartStealth Agent offers the following advantages over prior art:

1. High Resolution Profiling: Captures real-time micro-behavioral signals with high precision and minimal deviation from behavioral baselines.
2. Stealth Operation: Operates below detection thresholds of most traditional antivirus and EDR tools.

Hybrid Compatibility: Agent-based and agentless modes are natively supported. .3

4. Privacy-by-Design: Local preprocessing ensures data minimization; all telemetry is anonymized and encrypted.
5. Minimal Performance Overhead: Designed to operate with low CPU usage and negligible impact on system performance.
6. Adaptive AI: Incorporates reinforcement learning to adjust detection models based on user feedback loops.

Advantages Over Prior Art (Part B—Detailed Comparative)

SmartStealth introduces innovative solutions to the limitations of traditional agents (e.g., CrowdStrike, SentinelOne):

1. Rapid & Non-intrusive Deployment: Requires no administrative privileges or system reboots; deployable via enterprise orchestration platforms such as Intune, SCCM, or containerized CI/CD pipelines. Enables immediate operational readiness across large-scale environments with minimal IT friction.
2. Hybrid Mode: Seamless switch to agentless operation while maintaining substantial fidelity comparable to agent-based profiling.
3. Privacy-by-Design: Local preprocessing removes PII; compliant with GDPR/HIPAA.
4. DevSecOps Integration: Pre-built scripts and containers support CI/CD.
5. BYOD Support: Browser- or app-based deployments allow cognitive profiling without full control.

These features enable broad enterprise deployment, even in regulated industries, offering real-time identity defense with minimal friction.

DETAILED DESCRIPTION OF THE DRAWINGS

Figure 1:
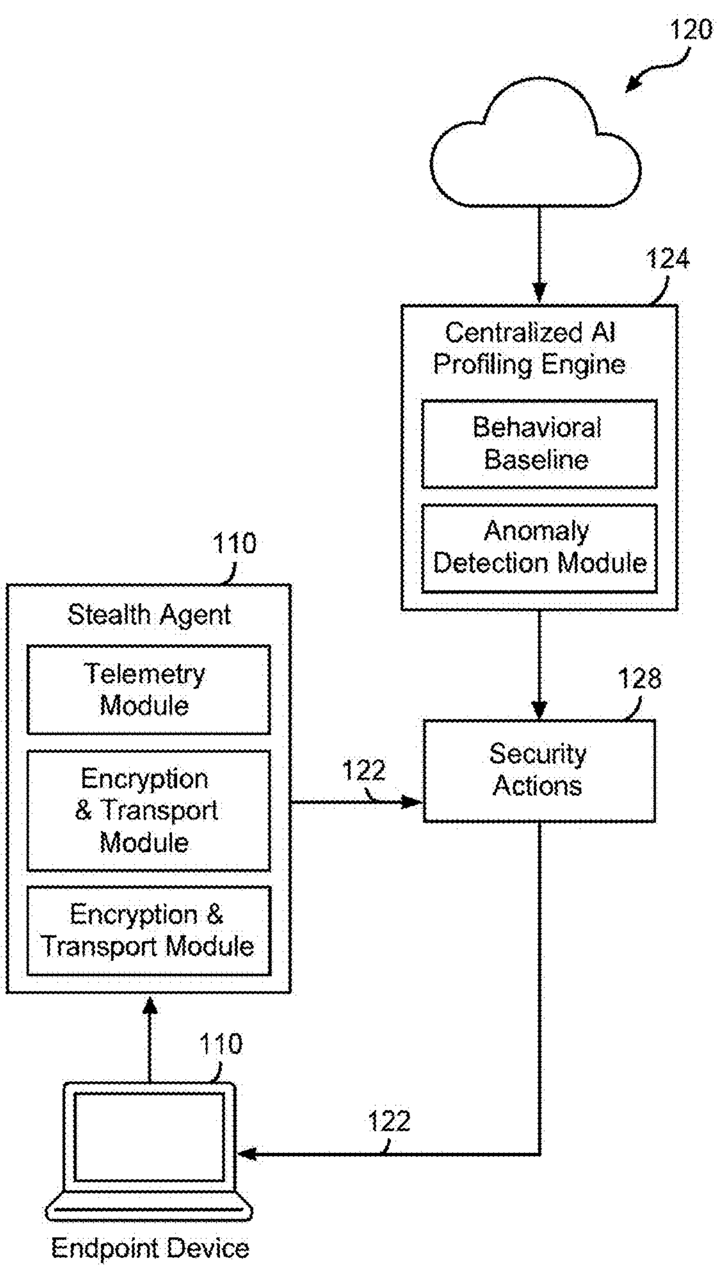
FIG. 1 (illustrating endpoint-side telemetry acquisition as the sole focus of the present invention) is a block diagram illustrating the overall system architecture of the SmartStealth Agent, including an endpoint device (110) that communicates over a secure encrypted channel (122) with a centralized behavioral analysis engine (124) external to the claimed invention, and a Security Action Module (128) within an enterprise environment (120).

FIG. 1 illustrates an overview of the SmartStealth Agent system architecture. An endpoint device (110) operates a lightweight stealth-mode agent that securely communicates via an encrypted telemetry channel (122) with a centralized enterprise environment (120). Within this environment resides a behavioral analysis engine (124), responsible for processing endpoint telemetry and generating operational behavioral indicators. Upon detecting significant deviations in these indicators, a Security Action Module (128) initiates context-aware responses such as session lockdown or alert propagation.

Figure 2:
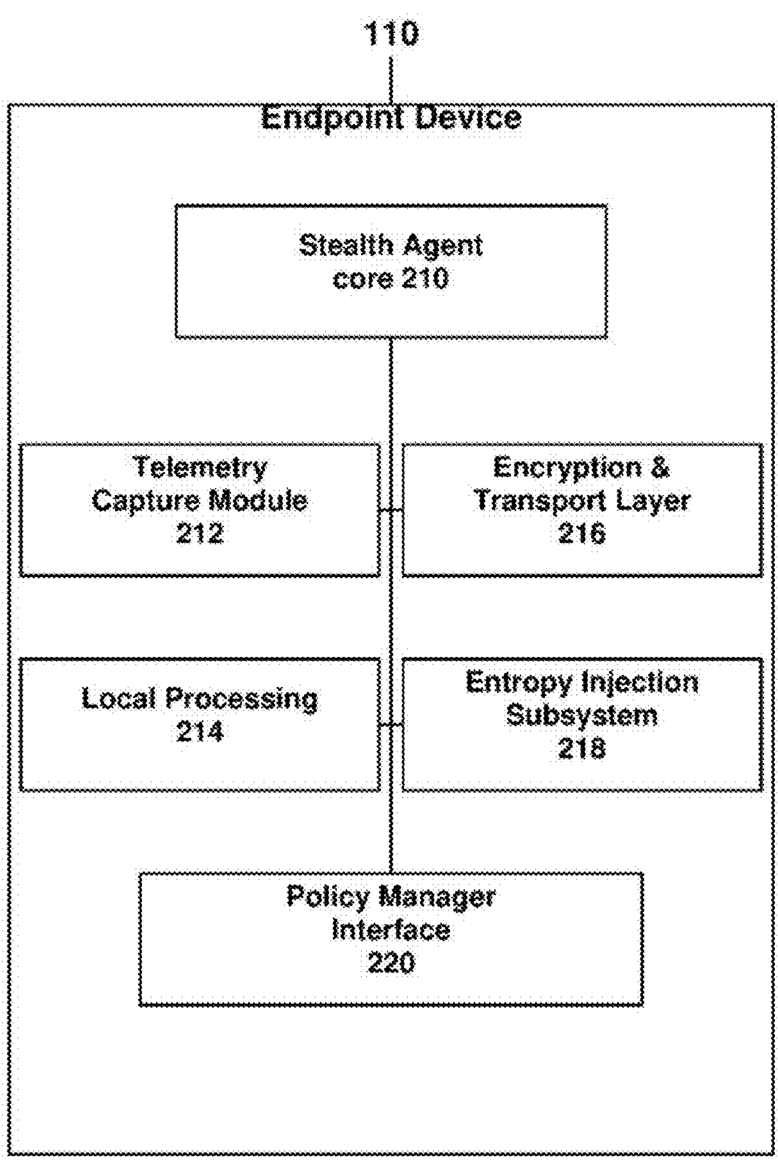
FIG. 2 is a schematic diagram showing the internal structure of the SmartStealth Agent residing on the endpoint device (110), comprising a core logic module (210), Telemetry Capture Module (212), Local Processing unit (214), Encryption and Transport Layer (216), Entropy Injection Subsystem (218), and a Policy Manager Interface (220).

FIG. 2 presents the internal architecture of the SmartStealth Agent deployed on the endpoint device (110). At its core is the Stealth Agent logic module (210), which orchestrates telemetry collection via the Telemetry Capture Module (212), performs inline privacy filtering through the Local Processing module (214), and encrypts outbound data using the Encryption & Transport Layer (216). The Entropy Injection Subsystem (218) enhances behavioral uniqueness by injecting controlled entropy into interaction patterns, aiding mimicry detection. All components are governed by enterprise policy rules enforced via the Policy Manager Interface (220). Deployment of the SmartStealth Agent requires no kernel-level drivers, no system reboots, and no user interaction. This streamlined architecture allows rapid provisioning across large enterprise environments using standard software deployment tools. As a result, the agent becomes operational immediately upon installation, significantly reducing the time between deployment and active threat protection. In addition to agent-based deployments, the SmartStealth Agent architecture supports an agentless mode of operation, designed to function in environments where endpoint installation is restricted or impractical. In agentless mode, the system leverages federated API integrations—such as Microsoft Graph API, Google Workspace Admin API, and virtual desktop telemetry streams—to collect behavioral signals without deploying software directly on user devices. This mode enables continuous monitoring of interaction metadata including window focus changes, application usage, typing cadence inferred from input event sequences, and session timing patterns.

While the telemetry granularity may be lower than full agent instrumentation, the system applies normalization and signal enhancement algorithms on the server-side to achieve cognitive profiling fidelity that is substantially equivalent to the agent-based mode. This allows organizations to extend neuro-cognitive identity assurance to BYOD, remote, and unmanaged environments while maintaining compliance and operational consistency. The fallback to agentless mode can be triggered dynamically based on device policy, security posture, or installation feasibility, ensuring that coverage is maintained without compromising user privacy or requiring elevated access privileges.

Figure 3:
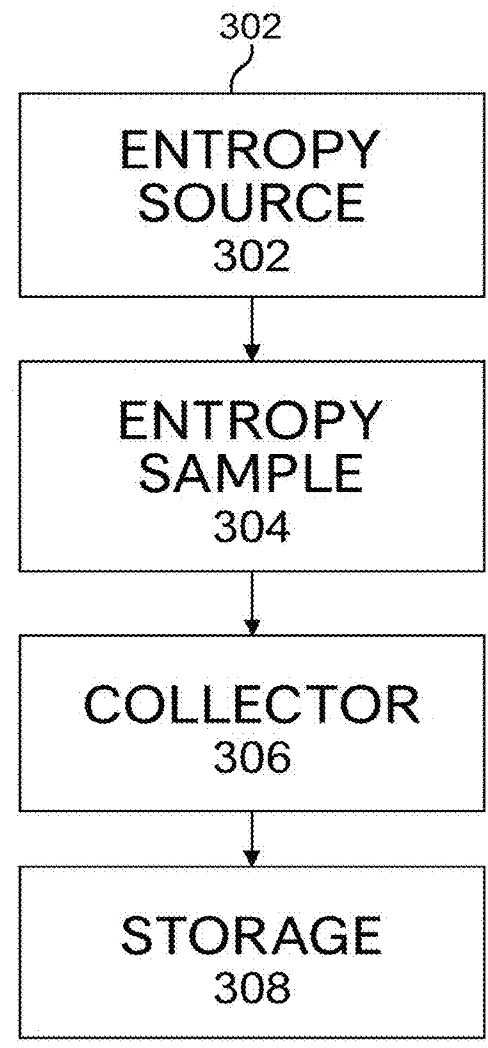
FIG. 3 is a flow diagram depicting the entropy sampling pipeline, including the Entropy Source (302), Entropy Sample (304), Collector (306), and Storage unit (308), which contribute to secure behavioral randomness.

FIG. 3 details the entropy sampling subsystem, which is responsible for gathering behavioral randomness. Entropy is initially acquired from one or more system-level sources (302), then segmented into discrete samples (304). These are subsequently processed by a Collector (306) and buffered within a Storage module (308) for use in injection and behavioral augmentation logic.

Figure 4:
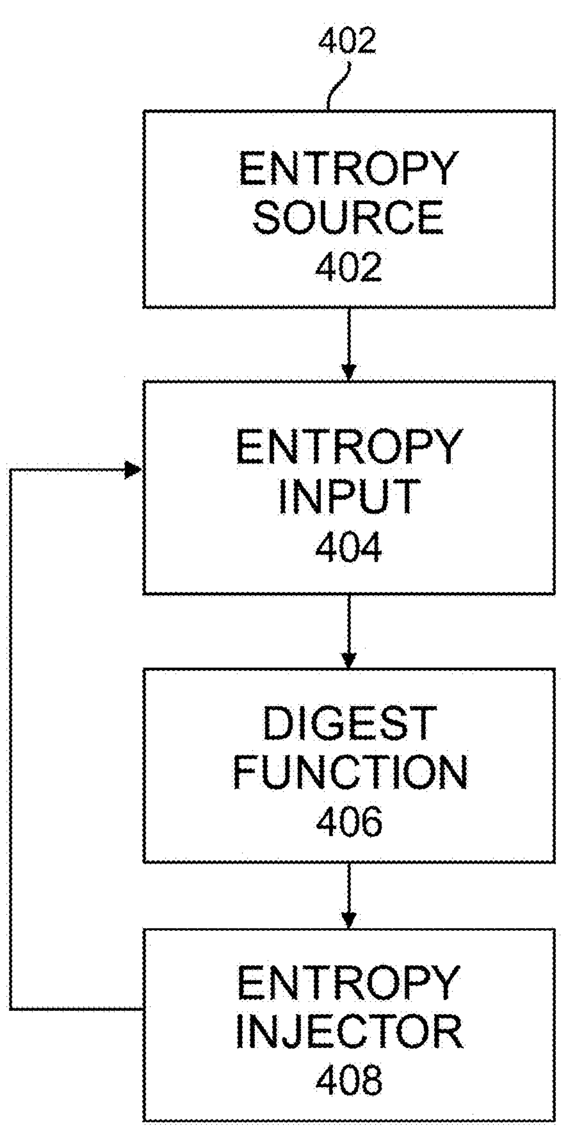
FIG. 4 is a block diagram of the entropy injection mechanism, illustrating data flow from the Entropy Source (402) through the Entropy Input module (404) and Digest Function (406) into the Entropy Injector (408), enabling mimicry detection.

FIG. 4 expands on the entropy injection pipeline. The Entropy Source (402) provides raw signal data, which enters the system through an Entropy Input module (404). This data is then processed by a Digest Function (406) to ensure statistical uniformity and robustness, before being passed to the Entropy Injector (408). The resulting signal enhances variability in telemetry, allowing the system to identify bot-simulated or spoofed behaviors.

Figure 5:
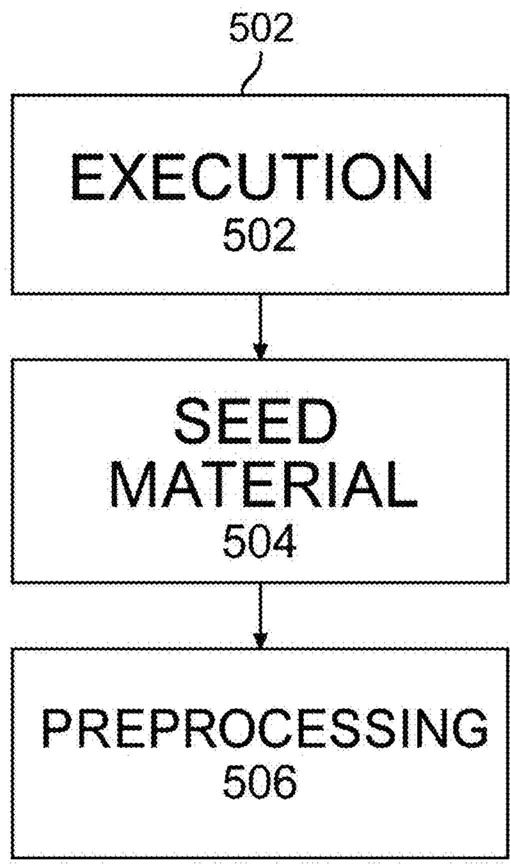
FIG. 5 is a simplified flowchart describing the preprocessing sequence, comprising the Execution Context (502), Seed Material Generator (504), and Preprocessing Unit (506), used to prepare telemetry prior to transmission.

FIG. 5 shows the preprocessing sequence prior to telemetry transmission. The Execution Context (502) initiates behavioral recording sessions, which generate Seed Material (504)—raw data derived from micro-interactions. This data is normalized and anonymized within the Preprocessing Unit (506) to remove personally identifiable information and ensure compliance with privacy standards before encryption and transport.

Figure 6:
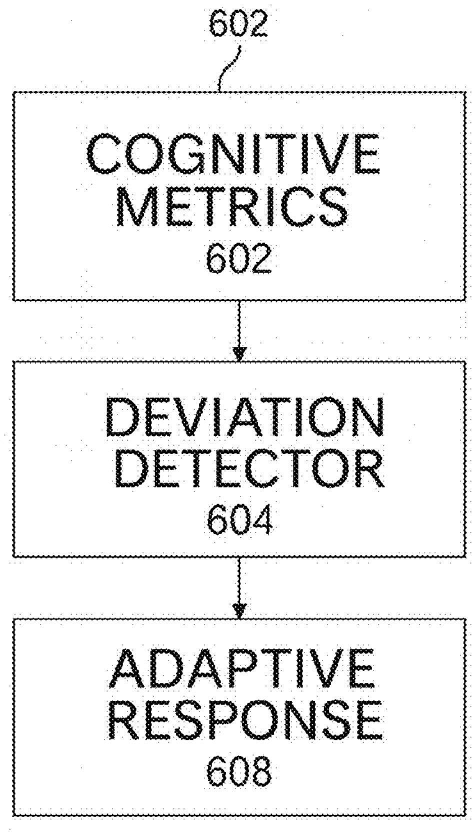
FIG. 6 is a process diagram representing the cognitive anomaly detection loop, starting with Cognitive Metrics aggregation (602), followed by a Deviation Detector (604), and an Adaptive Response module (608) for real-time enforcement.

FIG. 6 illustrates the cognitive anomaly detection feedback loop. Telemetry is first aggregated and synthesized into high-resolution Cognitive Metrics (602). These metrics are evaluated by a Deviation Detector (604), which compares current behavior against established baselines. If anomalies are detected, the Adaptive Response system (608) is triggered to take appropriate security actions based on risk severity and contextual awareness.

Figure 7:
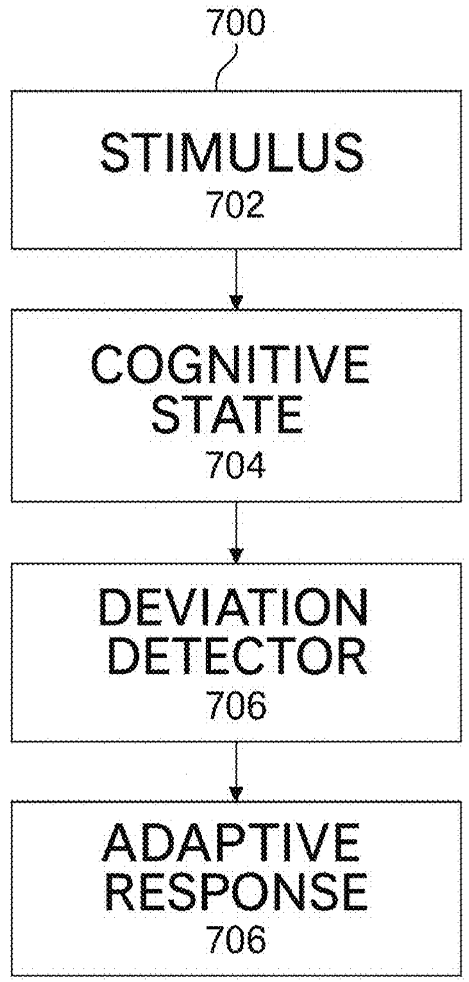
FIG. 7 is a logic diagram modeling user profiling through stimulus-response behavior, including the Stimulus Origin (700), incoming Stimulus (702), Measured Cognitive State (704), and Deviation Detector (706) triggering appropriate responses.

FIG. 7 models the stimulus-to-response behavioral profiling logic. A Stimulus Origin (700) generates a user-facing event or prompt (702), which results in a measurable cognitive or behavioral reaction (704). This is analyzed by a Deviation Detector (706) to assess conformity to expected patterns. If behavioral drift or inconsistency is detected, response actions are initiated by the cognitive engine.

The invention claimed is:

1. A method for secure neuro-cognitive user profiling within an enterprise cybersecurity system, comprising:

a. collecting micro-interaction telemetry from a user endpoint via a stealth software agent operating in the background without elevated permissions;

b. preprocessing the micro-interaction telemetry locally to remove or obfuscate personally identifiable information (PII);

c. encrypting the preprocessed micro-interaction telemetry using an industry-standard symmetric encryption protocol;

d. transmitting the encrypted micro-interaction telemetry to a remote cognitive analysis server;

e. applying behavioral fingerprint modeling at the remote cognitive analysis server to detect deviations from baseline profiles; and f. triggering automated security actions selected from the group consisting of: session termination, re-authentication, contextual alerts, or profile quarantine.

2. The method of claim 1, wherein the micro-interaction telemetry includes at least one of: typing cadence, cursor movement velocity, eye focus estimation, application foreground duration, or window-switching frequency.

3. The method of claim 1, wherein the stealth software agent operates without appearing in standard process monitoring tools or system tray indicators.

4. The method of claim 1, wherein the automated security actions are prioritized based on a severity score derived from behavioral deviation metrics.

5. The method of claim 1, further comprising storing anonymized micro-interaction telemetry in an immutable audit log for forensic review.

6. The method of claim 1, wherein offline micro-interaction telemetry is buffered locally and synchronized securely upon reconnection to the remote cognitive analysis server.

7. The method of claim 1, further comprising detecting simulated user behavior using a mimicry-evasion module that introduces entropy for detecting.

8. The method of claim 1, wherein the stealth software agent's behavior is governed by configurable enterprise policy parameters set by a security administrator.

9. The method of claim 1, wherein a profiling accuracy is sufficient to support individualized behavioral baselines under typical operating conditions.

10. The method of claim 1, wherein a behavioral model is personalized for each user and dynamically updated through reinforcement learning.

11. The method of claim 1, wherein the preprocessing removes biometric markers prior to encryption.

12. The method of claim 1, wherein the micro-interaction telemetry transmission is performed using mutual authentication and time-stamped session tokens.

13. The method of claim 1, wherein a profiling engine supports real-time streaming analysis and retroactive batch validation.

14. The method of claim 1, wherein the micro-interaction telemetry includes interaction metadata extracted from virtual desktop environments.

15. A system for secure neuro-cognitive user profiling within an enterprise cybersecurity environment, comprising:

an endpoint device operating a stealth-mode telemetry acquisition agent configured to collect high-resolution micro-interaction data from a user without elevated permissions, wherein the stealth-mode telemetry acquisition agent preprocesses the high-resolution micro-interaction data locally to remove or obfuscate personally identifiable information (PII) prior to transmission;

a secure encrypted communication channel coupling the endpoint device to a centralized enterprise environment, configured to transmit the preprocessed high-resolution micro-interaction data in encrypted form;

a behavioral analysis engine external to the endpoint device and the centralized enterprise environment, configured to process the received high-resolution micro-interaction data and generate operational behavioral indicators based on deviations from stored baseline profiles; and a security action engine within the enterprise cybersecurity environment, configured to initiate context-aware security responses, including but not limited to session termination, re-authentication prompts, contextual alerts, or behavioral profile quarantine, responsive to detected deviations in the behavioral indicators.

16. The system of claim 15, wherein the stealth-mode telemetry acquisition agent is deployed without requiring kernel-level drivers or rebooting a host system.

17. The system of claim 15, wherein the stealth-mode telemetry acquisition agent supports installation via enterprise orchestration platforms including Microsoft Intune or System Center Configuration Manager (SCCM).

18. The system of claim 15, further comprising a decision engine, wherein the decision engine can locally lock sessions or disable access to sensitive resources.

19. The system of claim 15, further comprising a profiling engine, wherein the profiling engine supports hybrid deployments across both on-premises and cloud environments.

20. The system of claim 15, wherein high-resolution micro-interaction data is collected in an agentless mode via federated Application Programming Interface (API) integrations with Microsoft Graph API or Google Workspace Admin API.

21. The system of claim 15, wherein an agentless mode achieves cognitive profiling fidelity substantially equivalent to agent-based operation.

22. The system of claim 15, further comprising an encryption engine, wherein the encryption engine supports configurable cryptographic algorithms based on enterprise compliance needs.

23. The system of claim 15, wherein each agent instance is assigned a unique ephemeral identifier to prevent correlation across sessions.

24. The system of claim 15, further comprising a profiling engine, wherein the profiling engine detects behavioral drift patterns using statistical anomaly detection combined with deep learning.

25. The system of claim 15, wherein the stealth-mode telemetry acquisition agent includes an uninstall monitor that logs all removal attempts.

26. The system of claim 15, further comprising a profiling engine, wherein the profiling engine operates independently of identity providers and single sign-on systems.

27. The system of claim 15, wherein user privacy toggles are dynamically enforced per jurisdictional regulation.

28. The system of claim 15, wherein high-resolution micro-interaction data is routed through federated logging channels without central data retention.

29. The system of claim 15, wherein agentless and agent-based modes can operate concurrently to validate user identity through multi-channel signals.

30. The system of claim 15, wherein the behavioral analysis engine interfaces with the endpoint device and/or the centralized enterprise environment via standard protocols.

* * * * *